US012671309B2

(12) United States Patent
Cho et al.

(10) Patent No.: US 12,671,309 B2
(45) Date of Patent: Jun. 30, 2026

(54) ELECTRICAL DEVICE INCLUDING SWITCHING CONVERTER WHICH CONTROLS A SWITCHING FREQUENCY TO BE OUTSIDE AN AUDIBLE NOISE RANGE

(71) Applicant: SAMSUNG ELECTRONICS CO., LTD., Suwon-si (KR)

(72) Inventors: Daewoong Cho, Suwon-si (KR); Kyeseok Yoon, Suwon-si (KR); Hosung Son, Suwon-si (KR); Sungwoo Lee, Suwon-si (KR); Woonhyung Heo, Suwon-si (KR); Jungwook Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 18/238,307

(22) Filed: Aug. 25, 2023

(65) Prior Publication Data

US 2024/0178759 A1     May 30, 2024

(30) Foreign Application Priority Data

Nov. 30, 2022    (KR) ........................ 10-2022-0165171

(51) Int. Cl.
*H02M 1/00*        (2007.01)
*H02M 3/158*       (2006.01)

(52) U.S. Cl.
CPC ....... *H02M 1/0035* (2021.05); *H02M 3/1588* (2013.01)

(58) Field of Classification Search
CPC .... H02M 3/156; H02M 1/0032; H02M 3/158; H02M 1/44; H02M 1/08; H02M 1/0058; H02M 1/0035; H02M 3/01
See application file for complete search history.

(56) References Cited

U.S. PATENT DOCUMENTS

| | | | |
|---|---|---|---|
| 8,014,176 B2 | 9/2011 | Melanson et al. | |
| 9,148,060 B2 | 9/2015 | Yang | |
| 9,621,018 B2 | 4/2017 | Guenther et al. | |
| 10,044,271 B1 * | 8/2018 | Assaad | ................... H03K 4/06 |

(Continued)

FOREIGN PATENT DOCUMENTS

| | | |
|---|---|---|
| EP | 2 216 889 A2 | 8/2010 |
| KR | 10-2020-0083023 A | 7/2020 |
| WO | 2016/044496 A2 | 3/2016 |

OTHER PUBLICATIONS

Communication dated Mar. 22, 2024 issued by the European Patent Office in European Application No. 23200002.6.

*Primary Examiner* — Gustavo A Rosario-Benitez
(74) *Attorney, Agent, or Firm* — Sughrue Mion, PLLC

(57) ABSTRACT
An electronic device is provided. The electronic device includes: a first transistor configured to connect an input voltage node to a switching node; a second transistor configured to connect the switching node to a ground node; a latch circuit configured to generate a first signal having a first frequency and to control the first frequency based on a level of a load current; a switching modulation circuit configured to generate a second signal having a second frequency which is 1/N (where N is a natural number) times the first frequency; and a controller configured to control each of the first transistor and the second transistor, based on the second signal.

15 Claims, 15 Drawing Sheets

(56) References Cited

U.S. PATENT DOCUMENTS

| | | | | |
|---|---|---|---|---|
| 10,128,743 | B2 * | 11/2018 | Lin .................. | H02M 3/33523 |
| 11,314,268 | B2 | 4/2022 | Han et al. | |
| 11,677,316 | B2 * | 6/2023 | Messina ............. | H02M 1/4208 |
| | | | | 363/39 |
| 2007/0041224 | A1 | 2/2007 | Moyse et al. | |
| 2011/0175584 | A1 | 7/2011 | Huber et al. | |
| 2014/0063865 | A1 | 3/2014 | Nate | |
| 2014/0177290 | A1 | 6/2014 | Zhang et al. | |
| 2015/0055377 | A1 | 2/2015 | Lim et al. | |
| 2015/0263608 | A1 * | 9/2015 | Abe .................. | H02M 3/1582 |
| | | | | 323/234 |
| 2016/0065060 | A1 * | 3/2016 | Zhuo ...................... | H02M 3/07 |
| | | | | 327/536 |
| 2018/0131275 | A1 | 5/2018 | Guan | |
| 2019/0181762 | A1 | 6/2019 | Liu et al. | |
| 2019/0238054 | A1 * | 8/2019 | Flaibani ................ | H02M 3/156 |
| 2021/0126537 | A1 | 4/2021 | Lalithambika et al. | |
| 2021/0211055 | A1 | 7/2021 | Harshey et al. | |
| 2021/0257920 | A1 | 8/2021 | Cheng et al. | |
| 2022/0209656 | A1 | 6/2022 | Yang et al. | |
| 2022/0255435 | A1 | 8/2022 | Yoon et al. | |
| 2023/0170781 | A1 * | 6/2023 | Chou ................ | H02M 3/33571 |
| | | | | 323/282 |
| 2023/0396178 | A1 * | 12/2023 | Hirai ................ | H02M 3/33573 |
| 2024/0006981 | A1 * | 1/2024 | Hashimoto ......... | H02M 1/0087 |
| 2024/0128866 | A1 * | 4/2024 | Villar Piqué ....... | H02M 1/0003 |

* cited by examiner

FIG. 2

ELECTRICAL DEVICE INCLUDING SWITCHING CONVERTER WHICH CONTROLS A SWITCHING FREQUENCY TO BE OUTSIDE AN AUDIBLE NOISE RANGE

CROSS-REFERENCE TO RELATED APPLICATION

This application is based on and claims priority under 35 U.S.C. § 119 to Korean Patent Application No. 10-2022-0165171, filed on Nov. 30, 2022, in the Korean Intellectual Property Office, the disclosure of which is incorporated by reference herein in its entirety.

BACKGROUND

The present disclosure relates to a converter, and more particularly, to an electronic device including a bidirectional switching converter.

As electronic technologies have advanced, various kinds of electronic devices have been developed. Mobile electronic devices may be driven by using a battery device included therein. A battery capacity has increased as the amount of power consumption of electronic devices has increased, and thus, batteries may be charged at various speeds, based on a level of a voltage supplied by a charger having a high-speed charging mode or a normal charging mode.

SUMMARY

One or more example embodiments provide an electronic device capable of changing a switching frequency in an audible frequency range to a switching frequency outside the audible frequency range.

According to an aspect of an example embodiment, an electronic device includes: a first transistor configured to connect an input voltage node to a switching node; a second transistor configured to connect the switching node to a ground node; a latch circuit configured to generate a first signal having a first frequency and to control the first frequency based on a level of a load current; a switching modulation circuit configured to generate a second signal having a second frequency which is 1/N (where N is a natural number) times the first frequency; and a controller configured to control each of the first transistor and the second transistor, based on the second signal.

According to another aspect of an example embodiment, an electronic device includes: a first transistor configured to connect an input node with a switching node according to a first control signal; a second transistor configured to connect the switching node with a ground node according to a second control signal; an inductor connected with the switching node and configured to conduct an inductor current, wherein the inductor current increases based on the first transistor being on and decreases based on the second transistor being on; an oscillator configured to generate a first signal, based on an error signal representing a difference between a reference level and a level of an input signal applied to the input node; a ramp generation circuit configured to generate a ramp signal, based on the first control signal and the second control signal; a comparator circuit configured to generate a second signal, based on the error signal and the ramp signal; a latch circuit configured to generate a third signal having a first frequency, based on the first signal and the second signal; a switching modulation circuit configured to generate a fourth signal having a second frequency which is less than the first frequency; and a controller configured to generate the first control signal and the second control signal, based on the fourth signal.

According to another aspect of an example embodiment, a method of controlling a bidirectional switching converter including a switching node, includes: generating a first signal having a first frequency; controlling the first frequency based on a level of a load current; generating a second signal having a second frequency; controlling the second frequency to 1/N (where N is a natural number of 2 or more) times the first frequency, while the first frequency is within a reference frequency range; controlling the second frequency to be equal to the first frequency, while the first frequency is outside the reference frequency range; and turning on a first transistor to precharge the switching node or a second transistor to discharge the switching node, based on the second signal.

BRIEF DESCRIPTION OF DRAWINGS

Embodiments will be more clearly understood from the following description of example embodiments, taken in conjunction with the accompanying drawings in which:

FIG. 2 is a diagram of an electronic device;

DETAILED DESCRIPTION

Figure 1:
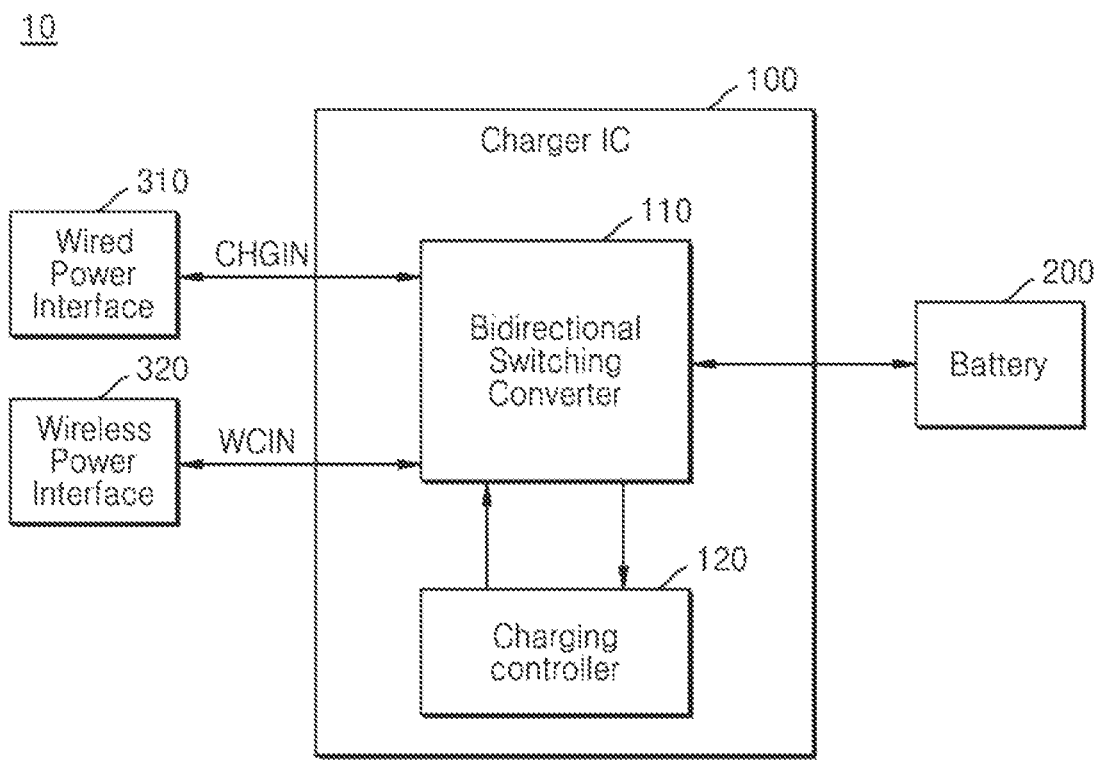
FIG. 1 is a block diagram schematically illustrating an electronic device including a charger integrated circuit, according to an example embodiment.

Hereinafter, various embodiments will be described in detail with reference to the accompanying drawings. The same or similar reference numerals may refer to the same elements throughout. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. Voltages may be referred to as "1" to indicate high states (or logical on), and "0" to indicate low states (or logical off).

FIG. 1 is a block diagram schematically illustrating an electronic device 10 including a charger integrated circuit, according to an example embodiment.

Referring to FIG. 1, the electronic device 10 may include a charger integrated circuit (IC) 100 and a battery 200. Furthermore, the electronic device 10 may further include a main processor and peripheral devices. For example, the electronic device 10 may include a mobile device such as a smartphone, a tablet personal computer (PC), a portable phone, a personal digital assistant (PDA), a laptop computer, a wearable device, a global positional system (GPS), an e-book terminal, a digital broadcasting terminal, an MP3 player, or a digital camera. For example, the electronic device 10 may be an electrical vehicle.

The battery 200 may be embedded in the electronic device 10. In an example embodiment, the battery 200 may be attachable/detachable on/from the electronic device 10. The battery 200 may include one battery cell or a plurality of battery cells. The plurality of battery cells may be connected with one another in series or parallel. When an external charging device is not connected with the electronic device 10, the battery 200 may supply power to the electronic device 10.

The charger IC 100 may charge the battery 200 and may be referred to as a battery charger. Also, the charger IC 100 may supply power to an external device (for example, via wired power interface 310 or wireless power interface 320) connected with the charger IC 100, based on a voltage provided by the battery 200. For example, the charger IC 100 may be implemented as an IC chip and may be mounted on a printed circuit board (PCB).

The charger IC 100 may include a bidirectional switching converter 110 and a controller 120. The bidirectional switching converter 110 may be implemented as a direct current (DC)-DC converter and may step down or up an input voltage to generate an output voltage.

The bidirectional switching converter 110 may operate in a buck mode (which may be referred to as a buck single mode), a boost mode (which may be referred to as a boost single mode), or a buck-boost mode (which may be referred to as a buck-boost combined mode).

In the buck mode, the bidirectional switching converter 110 may perform a buck converting operation through a first switching operation, and thus, may step up a voltage input thereto and may charge the battery 200, based on a stepped-up voltage.

In the boost mode, the bidirectional switching converter 110 may perform a boost converting operation through a second switching operation, and thus, may step up a voltage input from the battery 200 and may supply power to an external device, based on a stepped-up voltage.

In the buck-boost mode, the bidirectional switching converter 110 may perform the buck converting operation or the boost converting operation through a third switching operation, based on a load current. In the buck-boost mode, the bidirectional switching converter 110 may charge the battery 200, or may supply power to an external device.

The controller 120 may control mode switching between a plurality of charging modes (for example, the buck mode, the boost mode, and the buck-boost mode) of the bidirectional switching converter 110 and may control a switching operation of the bidirectional switching converter 110 so that a voltage level of an output voltage is equal or similar to a target voltage level in the plurality of charging modes.

In some example embodiments, the charger IC 100 may support at least one of various functions such as an under-voltage lockout (UVLO) function, an over-current protection (OCP) function, an over-voltage protection (OVP) function, a soft-start function of reducing an inrush current, a foldback current limit function, a hiccup mode function for short circuit protection, and an over-temperature protection (OTP) function, so that an operation is appropriately performed under a power saving condition.

In an example embodiment, the electronic device 10 may support wired charging and wireless charging, and may include a wired power interface 310 and a wireless power interface 320 for wired charging and wireless charging. In an example embodiment, the wired power interface 310 may include a wired charging circuit. The wireless power interface 320 may include a wireless charging circuit.

In the buck mode, the charger IC 100 may receive a first input voltage CHGIN through the wired power interface 310 and/or a second input voltage WCIN through the wireless power interface 320 and may charge the battery 200, based on the first input voltage CHGIN and/or the second input voltage WCIN.

In the boost mode, the charger IC 100 may supply power to the wired power interface 310 and/or the wireless power interface 320, based on a voltage of the battery 200.

In the buck-boost mode, the charger IC 100 may receive the first input voltage CHGIN through the wired power interface 310 or the second input voltage WCIN through the wireless power interface 320, may charge the battery 200, based on the first input voltage CHGIN or the second input voltage WCIN, and may supply power to the wireless power interface 320 or the wired power interface 310, based on the first input voltage CHGIN or the second input voltage WCIN. Alternatively, the charger IC 100 may supply power to the wireless power interface 320, based on the first input voltage CHGIN and a voltage of the battery 200, or may supply power to the wired power interface 310, based on the second input voltage WCIN and the voltage of the battery 200.

For example, a travel adapter (TA) (i.e., a power adapter) or a secondary battery may be electrically connected with the wired power interface 310. The TA may convert power, supplied from alternating current (AC) 110 V to 220 V (i.e., household power or another power supply source (for example, a computer)), into DC power needed for charging of the battery 200 and may supply the DC power to the electronic device 10. In the buck mode or the buck-boost mode, the charger IC 100 may charge the battery 200 or may supply power to the wireless power interface 320, based on the first input voltage CHGIN received from the TA or the secondary battery.

For example, an on the go (OTG) device (for example, OTG USB device or the like) may be connected with the wired power interface 310, and the charger IC 100 may supply power to the OTG device through the wired power interface 310. At this time, in the boost mode, the bidirectional switching converter 110 may supply power to the OTG device, based on the voltage of the battery 200, or in the buck mode, the bidirectional switching converter 110 may supply power to the OTG device while charging the battery 200, based on the second input voltage WCIN from the wireless power interface 320.

Figure 2:
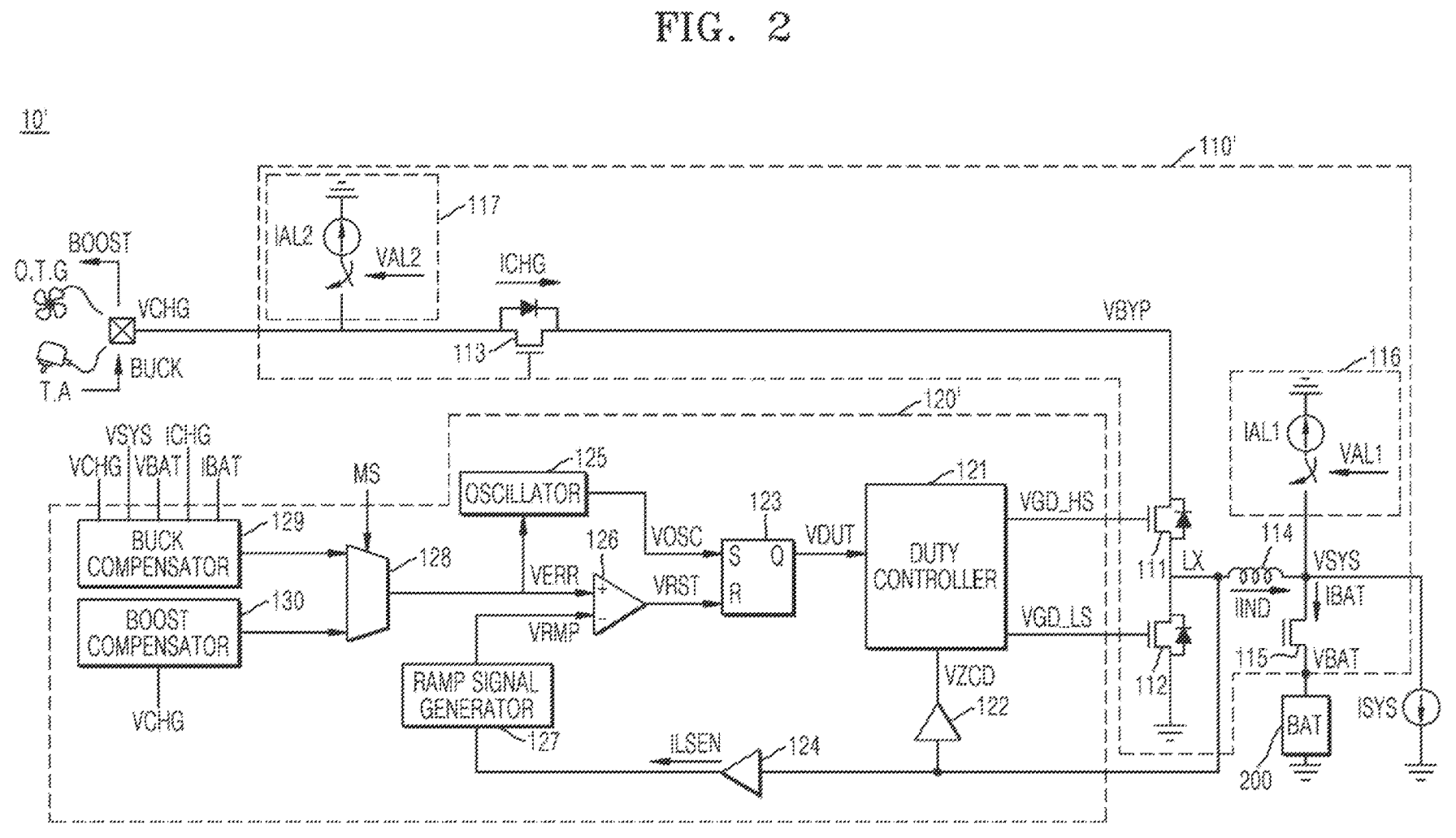
Figure 3:
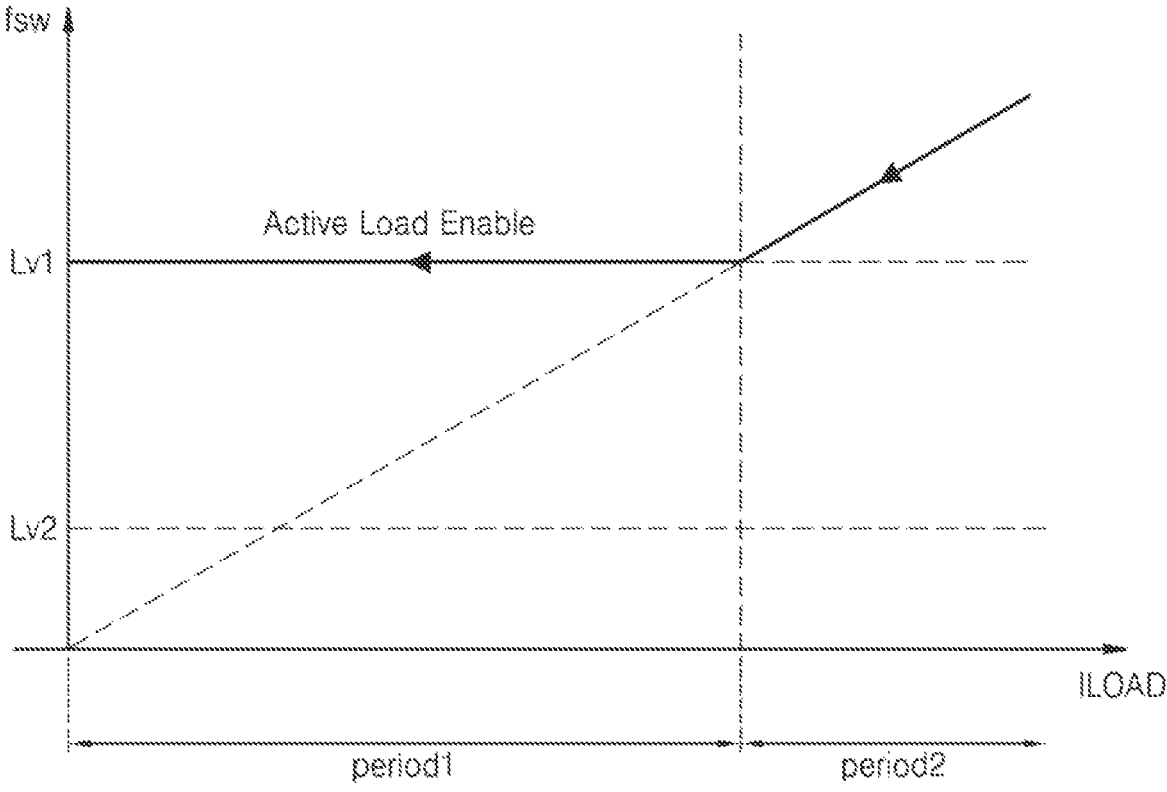
FIG. 3 is a diagram for describing a switching frequency based on a load current.

FIG. 2 is a diagram describing an electronic device 10'. FIG. 3 is a diagram describing a switching frequency based on a load current.

Referring to FIG. 2, the electronic device 10' may include a bidirectional switching converter 110', a controller 120', and a battery 200. In the buck mode, the bidirectional switching converter 110' may step up a voltage VCHG supplied from a TA to generate a voltage VSYS. Herein, terms referring to a voltage, such as VCHG and VSYS, may denote a node where a corresponding voltage is present. A current ISYS may be a model corresponding to a current consumed by a load and may be referred to as a load current, in the buck mode. The load may be supplied with power from a node VSYS. In the boost mode, the bidirectional switching converter 110' may step up a voltage VBAT of the battery 200 to generate a voltage VCHG. The OTG device may be supplied with power from a node VCHG, and a current consumed by the OTG device may be referred to as a load current.

The bidirectional switching converter 110' may include a first transistor 111, a second transistor 112, a third transistor 113, an inductor 114, a fourth transistor 115, a first active load 116, and a second active load 117. The third transistor 113 may be turned on in the buck mode or the boost mode. Referring to FIG. 2, in the buck mode, a voltage may be supplied to the bidirectional switching converter 110' through the third transistor 113 from the TA. One end of the third transistor 113 may be connected with the node VCHG, and the other end may be connected with a node VBYP.

The first transistor 111 may be turned on based on a control signal VGD_HS, and thus, may precharge a switching node LX, based on a level of a voltage VBYP. The second transistor 112 may be turned on based on a control signal VGD_LS, and thus, may discharge the switching node LX. As a level of the switching node LX varies, a current IIND flowing in the inductor 114 may vary, and thus, a level of the node VSYS may be determined.

To connect the node VSYS with the battery 200 or supply the current IBAT to the battery 200, the fourth transistor 115 may be turned on.

The controller 120' may include a duty controller 121, a zero current detector 122, a switching signal generator 123, a current sensor 124, an oscillator 125, a comparator 126, a ramp signal generator 127, a selector 128, a buck compensator 129, and a boost compensator 130.

The buck compensator 129 may compare signals VCHG, VSYS, VBAT, ICHG, and IBAT with different reference signals, respectively. The buck compensator 129 may detect a signal, having a greatest different level than a corresponding reference level, among signals VCHG, VSYS, VBAT, ICHG, and IBAT and may output a voltage representing a difference between the detected signal and a corresponding reference level. A signal may denote a voltage or a current. If the charging state of battery 200 is low, at least one of the signals VCHG, VSYS, VBAT, ICHG and IBAT may be lower than the corresponding reference signal. As the battery 200 is charged, the difference between the at least one of signals VCHG, VSYS, VBAT, ICHG and IBAT and the corresponding reference level may become zero or a positive level.

The boost compensator 130 may output a voltage representing a difference between the voltage VCHG and the reference level.

The selector 128 may select an output of the buck compensator 129 or the boost compensator 130, based on a mode signal MS. When the mode signal MS indicates the buck mode, the selector 128 may select an output of the buck compensator 129, and when the mode signal MS indicates the boost mode, the selector 128 may select an output of the boost compensator 130. An output of the selector 128 may be a voltage VERR. That is, the voltage VERR may have a level corresponding to a difference between one signal selected from among the signals VCHG, VSYS, VBAT, ICHG, and IBT and a reference level corresponding to the selected signal.

The oscillator 125 may generate a voltage VOSC, based on the voltage VERR. The voltage VOSC may be a signal which determines a timing for transitioning the control signal VGD_HS to an active state (for example, a logic high level or '1'). That is, the oscillator 125 may generate the voltage VOSC, based on a level of the voltage VERR, and thus, may adjust an activation timing of the control signal VGD_HS. The oscillator 125 will be described below in detail with reference to FIG. 6.

The comparator 126 may generate a voltage VRST, based on the voltage VERR and a voltage VRMP. The voltage VRMP may be referred to as a ramp signal. The voltage VRST may be a signal which determines a timing for transitioning the control signal VGD_LS to an active state. That is, the comparator 126 may generate the voltage VRST, based on the voltage VERR and the voltage VRMP, and thus, may control an activation timing of the control signal VGD_LS.

The ramp signal generator 127 may generate the voltage VRMP, based on a level of a current ILSEN. The voltage VRMP may have a repeated ramp waveform, and a magnitude of each cycle of the ramp waveform may be determined based on the current ILSEN. The ramp signal generator 127 will be described below in detail with reference to FIGS. 7 and 8.

The switching signal generator 123 may generate a voltage VDUT, based on the voltages VOSC and VRST. In detail, when '1' is applied to a set terminal S as the voltage VOSC is transitioned to an active state, the voltage VDUT of an output terminal Q may be transitioned to an active state, and when '1' is applied to a reset terminal R as the voltage VRST is transitioned to an active state, the voltage VDUT of the output terminal Q may be transitioned to an inactive state. The voltage VDUT may be referred to as a switching signal.

The duty controller 121 may generate the control signals VGD_HS and VGD_LS, based on the voltage VDUT and a voltage VZCD. In detail, when the switching signal VDUT is transitioned to an active state, the duty controller 121 may transition the control signal VGD_HS to an active state, and when the switching signal VDUT is transitioned to an inactive state, the duty controller 121 may transition the control signal VGD_LS to an active state. Also, the duty controller 121 may transition all of the control signals VGD_HS and VGD_LS to an inactive state, based on an activation timing of the voltage VZCD.

The zero current detector 122 may activate the voltage VZCD at a time at which a level of the current IIND becomes 0. That is, the zero current detector 122 may monitor the current IIND from the switching node LX, and thus, may detect a time at which a level of the current IIND becomes 0.

The sensor 124 may generate a current ILSEN representing an average level of the current IIND. The ramp signal generator 127 may adjust a level of the voltage VRMP, based on the current ILSEN.

In the buck mode, as a level of the current ISYS consumed by a load is reduced, a level of the voltage VSYS may increase, and the voltage VERR corresponding to a difference between the voltage VSYS and the reference level may be increased by the buck compensator 129. As the voltage VERR increases, a time at which the voltage VRST reaches the voltage VERR may be delayed, and thus, a frequency of the voltage VDUT may be lowered. As a frequency of the voltage VDUT is lowered, a rate of the voltage VCHG transferred to the node VSYS may be adjusted to be low. Accordingly, a level of the voltage VSYS may decrease.

When a switching frequency is within an audible frequency range, the switching frequency may be within an audible frequency range due to noise of an input signal or an output signal of the electronic device 10'. For example, if the electronic device 10' has a speaker, the switching frequency may be noise of the output signal of the speaker. If the electronic device 10' has a mic, the switching frequency may be noise of the input signal of the mic. The electronic device 10' may include a first active load 116 and a second active load 117, and may control the first active load 116 and the second active load 117 so that the switching frequency is not included in the certain band.

The first active load 116 may be connected with the node VSYS and may operate in the buck mode. In detail, the first active load 116 may consume a current IAL1 and may be selectively connected with the node VSYS, based on a control signal VAL1, and thus, may be activated. In the buck mode, when the current ISYS consumed by the load decreases, the first active load 116 may be activated so that a switching frequency fsw is not included in the certain band.

The second active load 117 may be connected with the node VCHG and may operate in the boost mode. In detail, the second active load 117 may consume a current IAL2 and may be selectively connected with the node VCHG, based on a control signal VAL2. In the boost mode, when a current consumed by the OTG device decreases, the second active load 117 may be activated so that the switching frequency fsw is not included in the certain band.

Referring to FIG. 3, when a level of a load current ILOAD decreases in a second period (period2), the switching frequency fsw may decrease. The load current ILOAD may be the current ISYS which is consumed by the load in the buck mode, or may be a current which is consumed by the OTG device in the boost mode.

When a level of the load current ILOAD decreases in a first period (period1), a level of the switching frequency fsw may be maintained. In detail, when a level of the load current ILOAD in the first period (period1) decreases, because the first active load 116 or the second active load 117 may be activated, a current consumed in the node VCHG or the node VSYS may be maintained to be constant. Thus, the switching frequency fsw may be maintained at a first level Lv1. A frequency between the first level Lv1 and the second level Lv2 may be an audible frequency. When the switching frequency fsw is an audible frequency range, noise may be audible to a user due to an input signal or an output signal of the electronic device 10'. Therefore, the electronic device 10' may control the first active load 116 and the second active load 117 so that the switching frequency fsw is not within the audible frequency range by controlling the first active load 116 or the second active load 117.

However, the first active load 116 and the second active load 117 may consume power independently from the OTG device or a load, and thus, power consumption may increase for adjusting the switching frequency fsw.

Figure 4:
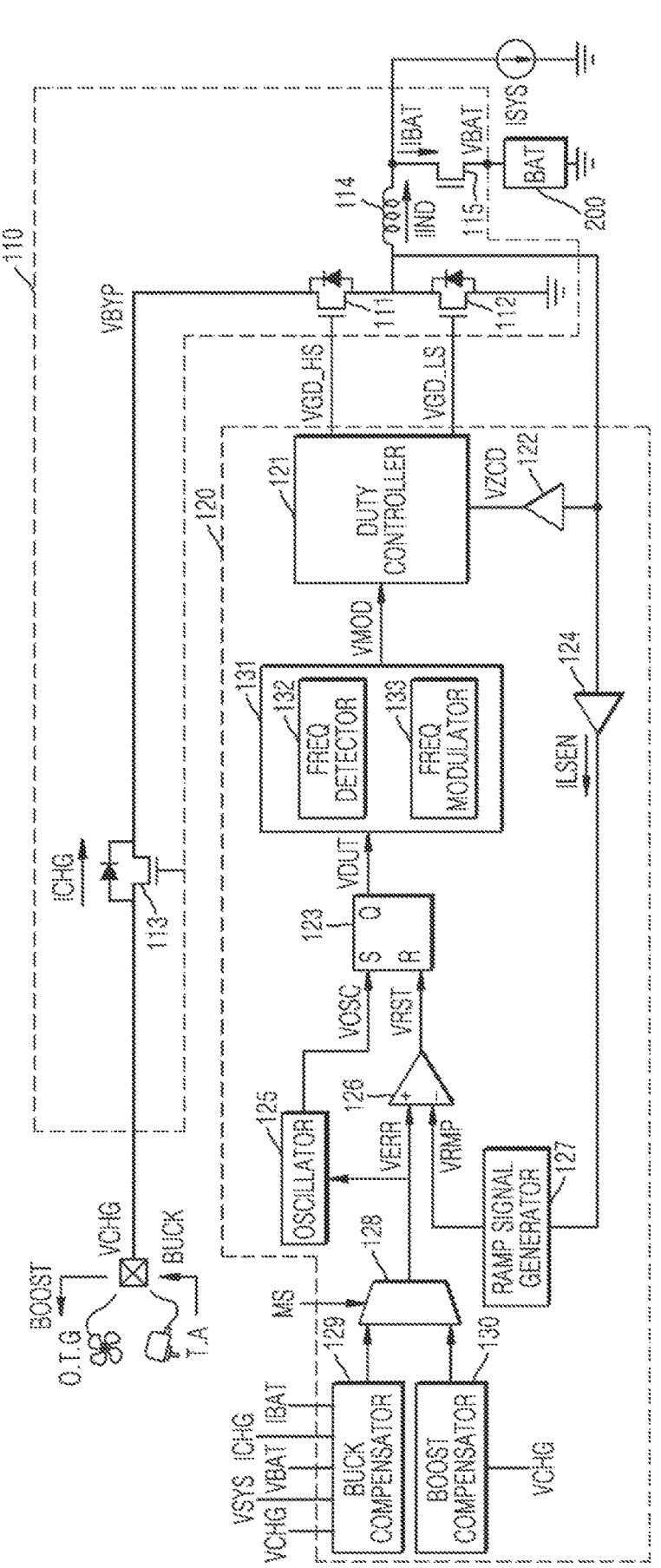
FIG. 4 is a diagram of an electronic device according to an example embodiment.

FIG. 4 is a diagram describing an electronic device 10 according to an example embodiment.

Referring to FIG. 4, unlike the electronic device 10', the electronic device 10 may include a switching modulator 131. In FIG. 4, it is illustrated that the bidirectional switching converter 110 does not include the first and second active loads 116 and 117 of FIG. 2, but example embodiments are not limited thereto.

The switching modulator 131 may detect a frequency of a voltage VDUT and may adjust (i.e., control) a frequency of a voltage VMOD, based on the detected frequency. An operation of adjusting the frequency of the voltage VMOD on the basis of the frequency of the voltage VDUT may be referred to as a frequency modulation operation. The frequency modulation operation may control the frequency of the voltage VMOD to be lower than the frequency of the voltage VDUT. For example, the frequency of the voltage VDUT may be 2 raised to the power of the frequency of the voltage VMOD. When the frequency of the voltage VDUT is within the audible frequency range, the switching modulator 131 may perform the frequency modulation operation, and thus, may generate the voltage VMOD having a frequency which is lower than the frequency of the voltage VDUT. The frequency of the voltage VMOD may be outside the audible frequency range.

The switching modulator 131 may include a frequency detector 132 and a frequency controller 133. The switching modulator 131 will be described below in detail with reference to FIG. 10.

The frequency detector 132 may detect the frequency of the voltage VDUT. In detail, the frequency detector 132 may determine the frequency of the voltage VDUT, based on an activation time of the voltage VDUT. The frequency detector 132 may provide the frequency controller 133 with a frequency control signal (for example, VUP and VDN of FIG. 10) representing whether to increase or decrease the frequency of the voltage VMOD, based on the frequency of the voltage VDUT.

The frequency controller 133 may generate the voltage VMOD, based on the frequency control signal. The frequency controller 133 may control a multiple of the frequency of the voltage VMOD which is to be set, with respect to the frequency of the voltage VDUT.

Figure 5:
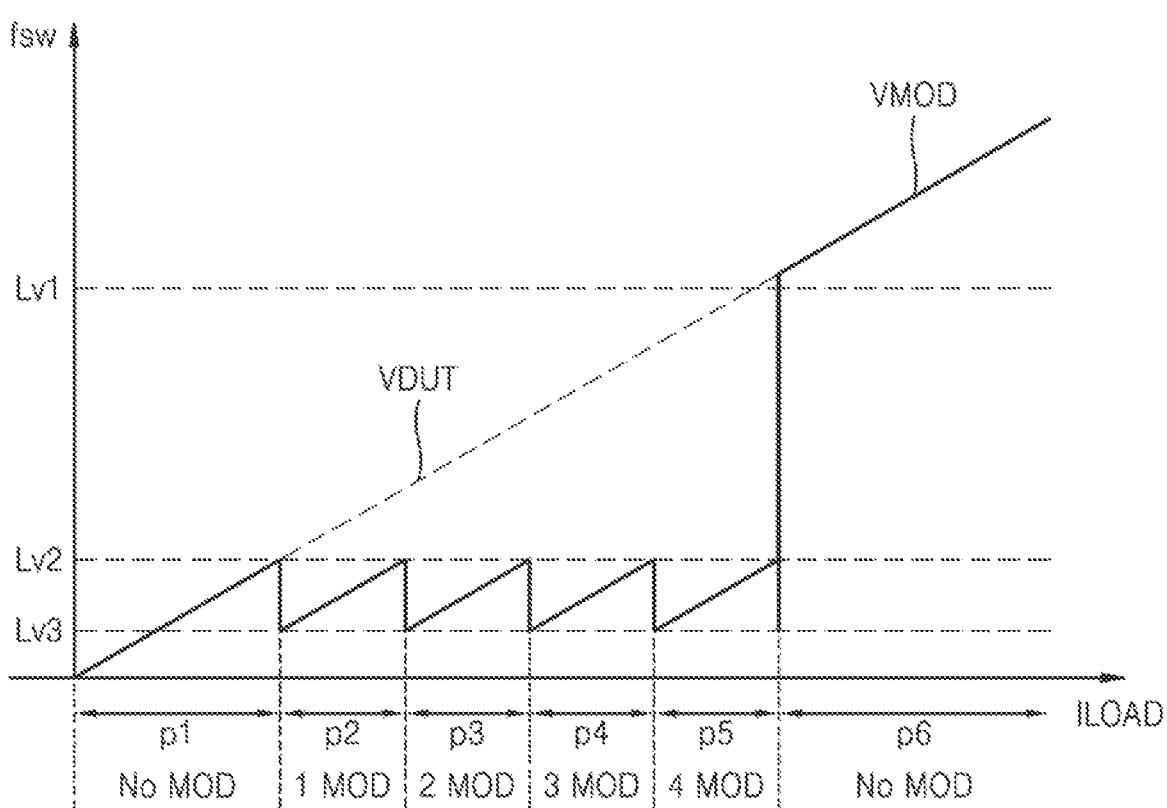
FIG. 5 is a diagram for describing frequency modulation according to an example embodiment.

FIG. 5 is a diagram describing frequency modulation according to an example embodiment. FIG. 5 will be described below with reference to FIG. 4.

Referring to FIG. 5, a frequency of a voltage VDUT may increase in proportion to a load current ILOAD. In the FIG. 5, the frequency of the voltage VDUT increases in directly proportional to the load current ILOAD, but embodiments are not limited thereto. For example, the frequency of the voltage VDUT increases exponential to the load current ILOAD. A frequency of a voltage VMOD may be controlled to be less than the frequency of the voltage VDUT through a frequency modulation operation. The frequency modulation operation may denote N-times (where N is a natural number) modulation operations, and in an N-times modulation operation, the frequency of the voltage VMOD may corresponding to 1/N of the frequency of the voltage VDUT.

In detail, in a first period p1 where the load current ILOAD increases from 0, the frequency modulation operation may not be performed. In the first period p1, the switching modulator 131 may generate the voltage VMOD having the same frequency as the frequency of the voltage VDUT.

In a second period p2 where a switching frequency of the voltage VDUT reaches a second level Lv2, a 2-times modulation operation 1MOD may be performed. A frequency range between a first level Lv1 and the second level Lv2 may be an audible frequency range. In detail, the switching modulator 131 may generate the voltage VMOD having a frequency having a third level Lv3. The third level Lv3 may correspond to ½ of the second level Lv2. That is, the voltage VMOD may be generated to have a frequency corresponding to ½ of the frequency of the voltage VDUT. In the second period p2, as the load current ILOAD increases, the frequency of the voltage VMOD may increase from the third level Lv3.

In a third period p3 where the switching frequency of the voltage VMOD reaches the second level Lv2, a 4-times modulation operation 2MOD may be performed. In this regard, when the switching frequency of the voltage VDUT reaches 2 times the second level Lv2, the 2-times modulation operation 1MOD may stop and a 4-times modulation operation 2MOD may be performed. The switching modulator 131 may generate the voltage VMOD having a switching frequency corresponding to ¼ of a switching frequency of the voltage VDUT. That is, the switching modulator 131 may generate the voltage VMOD having a switching frequency having the third level Lv3.

Likewise, whenever the switching frequency of the voltage VMOD reaches the second level Lv2 as the load current ILOAD increases, the 4-times modulation operation 2MOD may stop and an 8-times modulation operation 3MOD, and the 8-times modulation operation 3MOD may stop and a 16-times modulation operation 4MOD may be performed on the voltage VMOD. In this regard, when the switching frequency of the voltage VDUT reaches 4 times the second level Lv2 while the 4-times modulation operation 2MOD is being performed, the 4-times modulation operation 2MOD may be stopped and an 8-times modulation operation 3MOD may be performed on the voltage VMOD. When the switching frequency of the voltage VDUT reaches 8 times the second level Lv2 while the 8-times modulation operation 3MOD is being performed, the 8-times modulation operation 3MOD may be stopped and an 16-times modulation operation 4MOD may be performed on the voltage VMOD. In a fourth period p4 where the 8-times modulation operation 3MOD is performed, the frequency of the voltage VMOD may correspond to ⅛ of the frequency of the voltage VDUT. That is, when the switching frequency of the voltage VDUT reaches $2^N$ times the second level Lv2, a $2^N$-times modulation operation may be stopped and a $2^{N+1}$-times modulation operation is being performed. At a start of the $2^{N+1}$-times modulation operation, the switching frequency of the voltage VMOD may be the third level (e.g. ½ of the second level Lv2).

In a fifth period p5 where the 16-times modulation operation 4MOD is performed, the frequency of the voltage VMOD may correspond to 1/16 of the frequency of the voltage VDUT.

In a sixth period p6 where the frequency of the voltage VDUT is greater than the first level Lv1, the switching modulator 131 may cease performing a frequency modulation operation. That is, because a frequency is outside the audible frequency range, a frequency modulation operation may not be performed.

In FIG. 5, it has been described that the frequency of each of the voltage VDUT and the voltage VMOD varies as the load current ILOAD increases progressively, the above description may be applied to a case where the load current ILOAD decreases progressively. For example, in a case where the load current ILOAD decreases progressively, a frequency modulation operation may not be performed when the frequency of the voltage VDUT is greater than the first level Lv1, and when the frequency of the voltage VDUT reaches the first level Lv1, the 16-times, 8-times, 4-times, and 2-times modulation operations 4MOD, 3MOD, 2MOD, and 1MOD may be sequentially performed.

Figure 6:
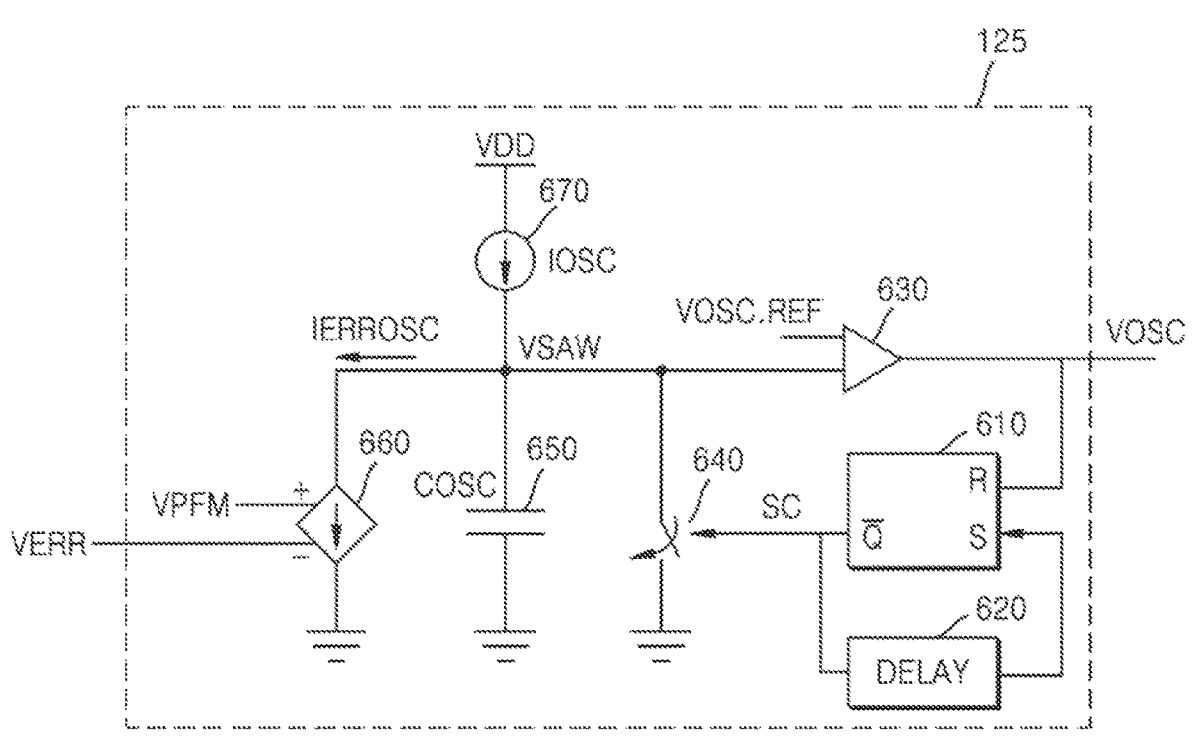
FIG. 6 is a diagram of an oscillator according to an example embodiment.

FIG. 6 is a diagram describing an oscillator 125 according to an example embodiment.

Referring to FIG. 6, the oscillator 125 may include a latch circuit 610, a delay circuit 620, a comparator 630, a switch 640, a capacitor 650, a dependent current source 660, and an independent current source 670.

The independent current source 670 may precharge a node VSAW, based on a current IOSC. The dependent current source 660 may generate a current IERROSC based on a difference between a voltage VPFM and a voltage VERR. One end of the capacitor 650 may be connected with the node VSAW. A capacitance of the capacitor 650 may be referred to as COSC.

The comparator 630 may compare a voltage VSAW and a comparison voltage VOSC.REF and may output a comparison result as a voltage VOSC. For example, when the voltage VSAW is greater than the comparison voltage VOSC.REF, the comparator 630 may output '1', and when the voltage VSAW is less than or equal to the comparison voltage VOSC.REF, the comparator 630 may output '0'.

The latch circuit 610 may receive the voltage VOSC through a reset terminal R and may output a switching control signal SC through an inverting output terminal $\overline{Q}$. The delay circuit 620 may delay the switching control signal SC and may provide the delayed switching control signal SC to a set terminal S. For example, when '1' is received through the reset terminal R, '1' may be output through an inverting output terminal $\overline{Q}$, and when '1' is received through the set terminal S, '0' may be output through an inverting output terminal $\overline{Q}$.

The switch 640 may selectively connect the node VSAW with a ground node, based on the switching control signal SC. For example, when the switching control signal SC is '1', the switch 640 may connect the node VSAW with the ground node to discharge the node VSAW, and when the switching control signal SC is '0', the switch 640 may release a connection between the node VSAW and the ground node.

The node VSAW may be precharged with a current obtained by subtracting the current IERROSC from the current IOSC. A level of the current IERROSC may be adjusted based on a level of the voltage VERR, and a speed at which the voltage VSAW is precharged may be adjusted based on a level of the current IERROSC. Accordingly, a time at which the voltage VOSC is '1' may be adjusted by the current IERROSC.

Figure 7:
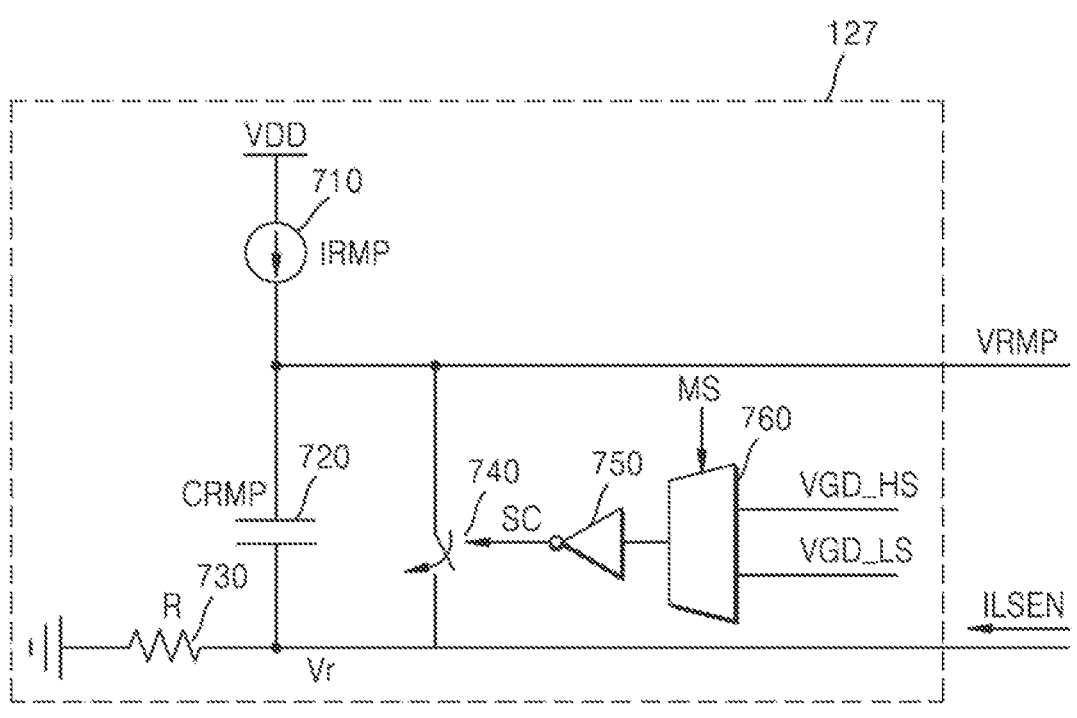
FIG. 7 is a diagram of a ramp signal generator according to an example embodiment.

FIG. 7 is a diagram describing a ramp signal generator 127 according to an example embodiment.

Referring to FIG. 7, the ramp signal generator 127 may include an independent current source 710, a capacitor 720, a resistor 730, a switch 740, an inverter 750, and a selection circuit 760.

The independent current source 710 may precharge a node VRMP, based on a current IRMP, and thus, the capacitor 720 having a capacitance CRMP may be charged.

A voltage Vr of the resistor 730 having a resistance value R may be determined by a current ILSEN. For example, referring to FIG. 8, a magnitude of a ramp start level of a voltage VRMP may be a voltage Vr. A charged voltage of the capacitor 720 may be added to the voltage Vr, and thus, the voltage VRMP having a ramp waveform may be generated. For example, referring to FIG. 8, a slope of a ramp waveform may be determined based on a level of the current IRMP and the capacitance CRMP.

The switch 740 may selectively connect the node VRMP with the node Vr (or the ground node), based on a switching control signal SC. For example, when the switching control signal SC is '1', the switch 740 may connect the node VRMP with the node Vr to discharge the node VRMP, and when the switching control signal SC is '0', the switch 740 may disconnect the node VRMP from the node Vr.

The selection circuit 760 may output one of control signals VGD_HS and VGD_LS as a control signal, based on a mode signal MS, and the inverter 750 may output an inverted control signal as the switching control signal SC. For example, in a buck mode, the selection circuit 760 may output the control signal VGD_HS, and the inverter 750 may invert the control signal VGD_HS.

The node VRMP may be selectively connected with the node Vr, based on the control signal VGD_HS, and thus, an activation time of the control signal VGD_HS may match an activation time of the node VRMP.

Figure 8:
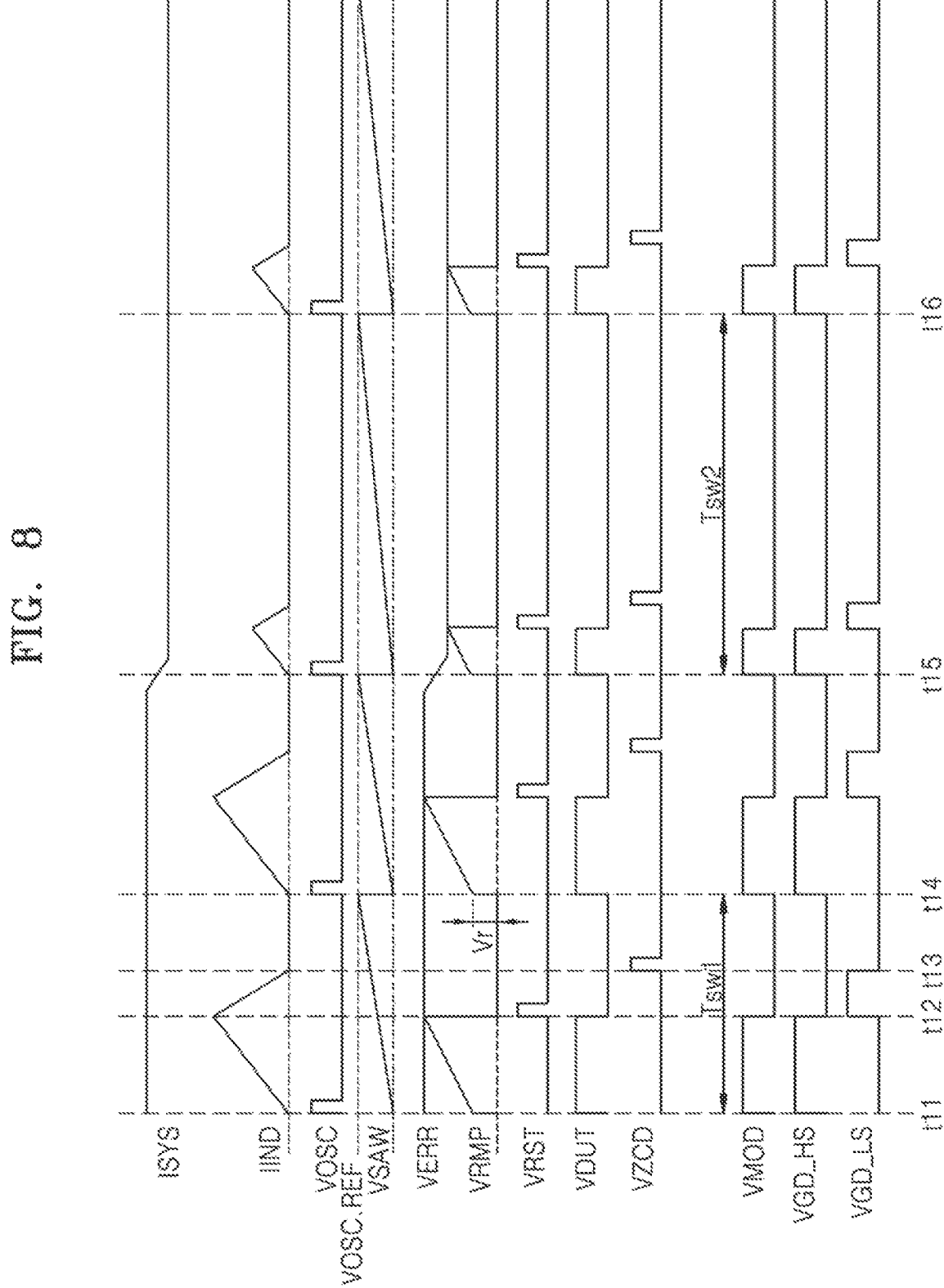
FIG. 8 is a timing diagram for describing an operating method of an electronic device, according to an example embodiment.

FIG. 8 is a timing diagram describing an operating method of an electronic device, according to an example embodiment. FIG. 8 will be described with reference to FIGS. 1 to 7. FIG. 8 may be a diagram describing an example embodiment where a switching frequency varies in the sixth period p6 of FIG. 5.

Referring to FIG. 8, a level of a current ISYS may decrease at a fifth time t15, and thus, a switching period may increase from a first switching period Tsw1 to a second switching period Tsw2. That is, the switching frequency may decrease.

Referring to FIG. 8, because a frequency modulation operation is not performed, a switching frequency of the voltage VDUT may be the same as a switching voltage of the voltage VMOD.

At a first time t11, as the voltage VOSC is activated to '1', the voltage VDUT may be activated to '1' by the switching signal generator 123. The voltage VOSC may be activated to '1' for a delay time by using the latch circuit 610 and the delay circuit 620, and after the delay time elapses, the voltage VOSC may be deactivated to '0'. The switching modulator 131 may output the same voltage VMOD as the voltage VDUT. The voltage VDUT may be '1', and thus, the control signal VGD_HS may be activated to '1' and the control signal VGD_LS may be deactivated to '0' by a duty controller 121. Based on the control signal VGD_HS being activated to '1', the first transistor 111 may be turned on, and thus, a current IIND flowing in an inductor 114 may increase.

Moreover, the voltage VSAW may be precharged by the oscillator 125 up to a fourth time t14 from the first time t11.

At a second time t12, as the voltage VRMP reaches the voltage VERR, a voltage VRST may be activated to '1', and the voltage VDUT may be deactivated to '0' by the switching signal generator 123. The voltage VMOD may be equal to the voltage VDUT, based on the switching modulator 131. The voltage VMOD may be '0', and thus, the control signal VGD_LS may be activated to '1' and the control signal VGD_HS may be deactivated to '0' by the duty controller 121.

Based on the control signal VGD_LS being activated to '1', the second transistor 112 may be turned on, and thus, the current IIND flowing in the inductor 114 may decrease.

At a third time t13, the current IIND flowing in the inductor 114 may be '0', and the voltage VZCD may be activated to '1' by a zero current detector 122. The duty controller 121 may deactivate the control signals VGD_HS and VGD_LS to '0', based on the activated voltage VZCD.

At the fourth time t14, as the voltage VSAW reaches the voltage VOSC.REF, the voltage VOSC may be activated to '1' by the oscillator 125.

The voltage VDUT may be activated by the voltage VOSC and the voltage VDUT and the voltage VMOD may have the same frequency, and thus, a switching period Tsw1 of the voltage VMOD may be construed as a time period between the first time t11 and the fourth time t14.

Referring to FIG. 8, as a level of the current ISYS decreases, a level of the voltage VSYS may increase, and a level of the voltage VERR representing a difference between a reference voltage and the voltage VSYS may decrease.

As a level of the voltage VERR decreases, a timing at which the comparator 126 of FIG. 2 activates the voltage VRST may be earlier. Also, the switching signal generator 123 may reset the voltage VDUT, based on activation of the voltage VRST, and thus, a timing at which the voltage VDUT is transitioned to '0' may be earlier, whereby an activation period of the voltage VDUT may be shortened. Furthermore, as a level of the voltage VERR decreases, a current IERROSC based on the dependent current source 660 of FIG. 6 may increase. Accordingly, a time for which the node VSAW is precharged and reaches the voltage VOSC.REF may increase, and thus, an activation period of the voltage VOSC may be delayed. That is, a switching period Tsw2 of the voltage VMOD may be construed as a time period between the fifth time t15 and the sixth time t16 and may be longer than the switching period Tsw1.

Thus, as shown in FIG. 8, as a rising slope of the voltage VRMP is reduced, a switching frequency of the voltage VDUT may decrease, and as an activation period of the voltage VDUT is shortened, a rate of a voltage VCHG provided to the node VSYS may be lowered.

Figure 9:
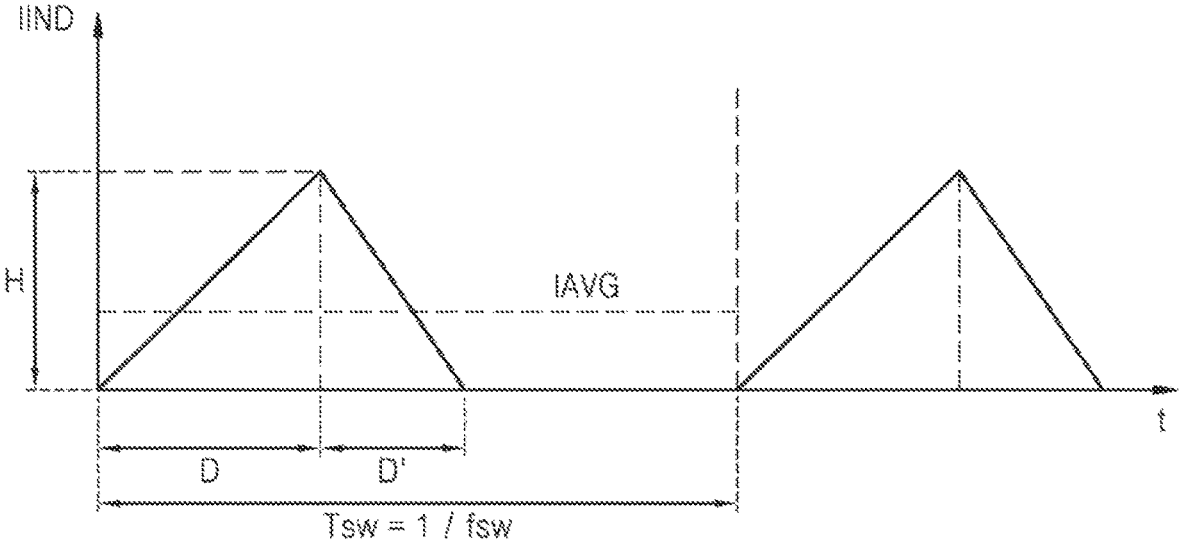
FIG. 9 is a diagram for describing a switching frequency according to an example embodiment.

FIG. 9 is a diagram for describing a switching frequency according to an example embodiment. A current IIND of FIG. 9 may be the current IIND flowing in the inductor 114 at the first to fifth times t11 to t15 of FIG. 8.

Referring to FIG. 9, the current IIND may increase in a time period D and may decrease in a time period D'. A highest level of the current IIND may be H, a switching period of the current IIND may be Tsw, and a switching frequency may be fsw. An average level of the current IIND in the switching period Tsw may be IAVG.

The highest level H may be calculated based on the following Equation 1.

$$H = \frac{VCHG - VSYS}{LIND}D = \frac{VSYS}{LIND}D' \qquad \text{[Equation 1]}$$

Here, VCHG may denote a voltage applied to a node VCHG in the buck mode, VSYS may denote a voltage supplied to a load, and LIND may denote an inductance of the inductor 114.

Also, based on Equation 1, D and D' may have a relationship expressed as the following Equation 2.

$$D' = \frac{VCHG - VSYS}{VSYS}D \qquad \text{[Equation 2]}$$

An electric charge Q may be accumulated into or discharged from the inductor 114, based on the current IIND flowing in the inductor 114, and may be calculated as expressed in the following Equation 3.

$$Q = \frac{1}{2}(D + D')H = \frac{1}{2}\left(\frac{VCHG}{VSYS}D\right) \cdot \frac{VCHG - VSYS}{LIND}D = \qquad \text{[Equation 3]}$$

-continued $$\frac{1}{2}\frac{VCHG}{LIND}\left(\frac{VCHG-VSYS}{VSYS}\right)D^2$$

The average level IAVG may be calculated as expressed in the following Equation 4.

$$IAVG = \frac{Q}{Tsw} = Q \cdot fsw = \frac{1}{2}\frac{VCHG}{LIND}\left(\frac{VCHG-VSYS}{VSYS}\right)D^2 \cdot fsw \quad \text{[Equation 4]}$$

The average current IAVG may be understood as a current Iout flowing in the load, and thus, the switching frequency fsw may be calculated as expressed in the following Equation 5.

$$fsw = \frac{2LIND \cdot VSYS}{VCHG \cdot (VCHG-VSYS) \cdot D^2} \quad \text{[Equation 5]}$$

In FIG. 9, a process of calculating the switching frequency fsw in the buck mode has been described above, but a process of calculating the switching frequency fsw in the boost mode may be similar thereto. That is, in the boost mode, a voltage may be supplied to the node VBAT of the battery 200 instead of being supplied through the node VCHG and the load may be connected with the node VCHG instead of the node VSYS, and thus, the switching frequency fsw may be calculated in the boost mode.

Figure 10:
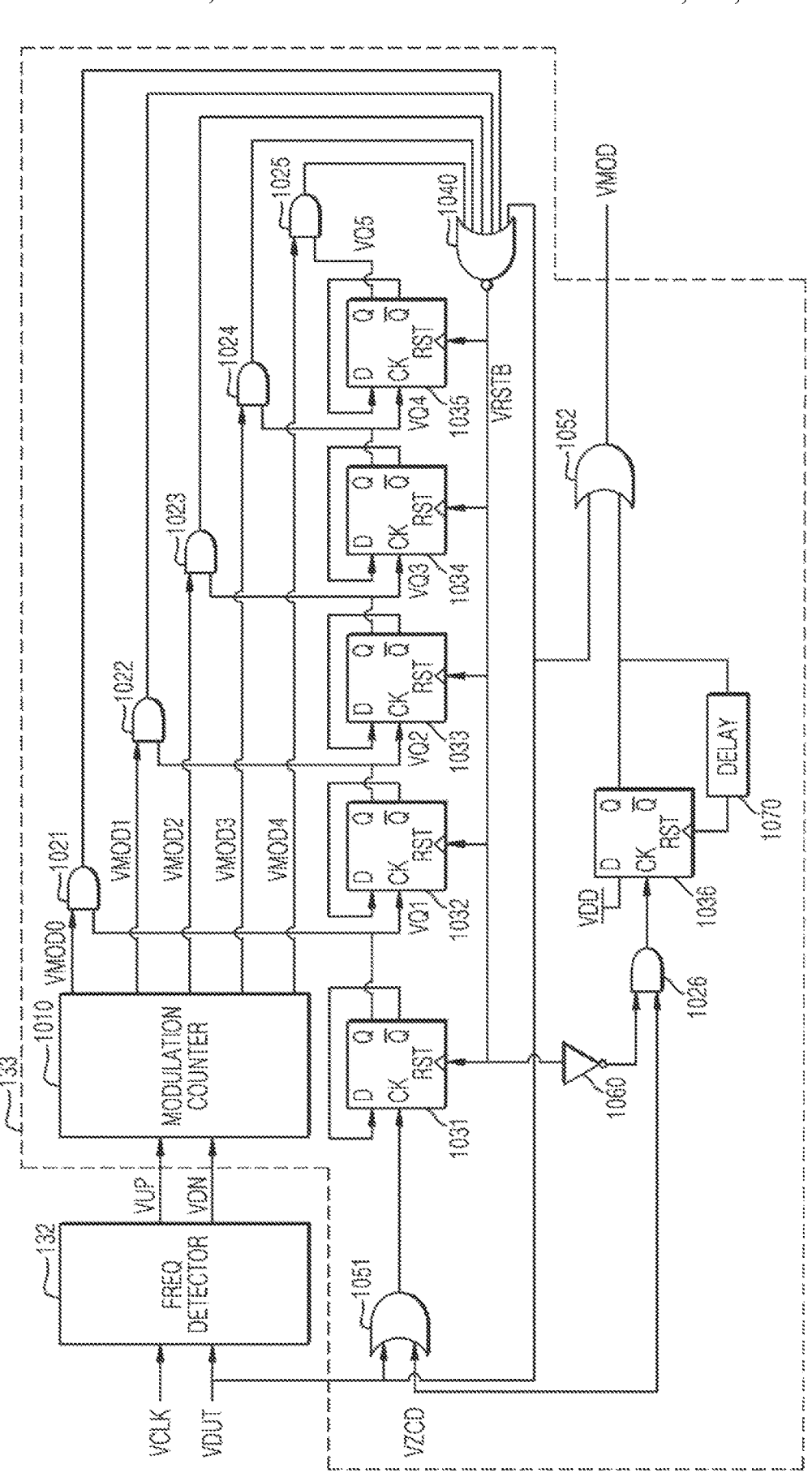
FIG. 10 is a diagram for describing a switching modulator according to an example embodiment.
Figure 11A:
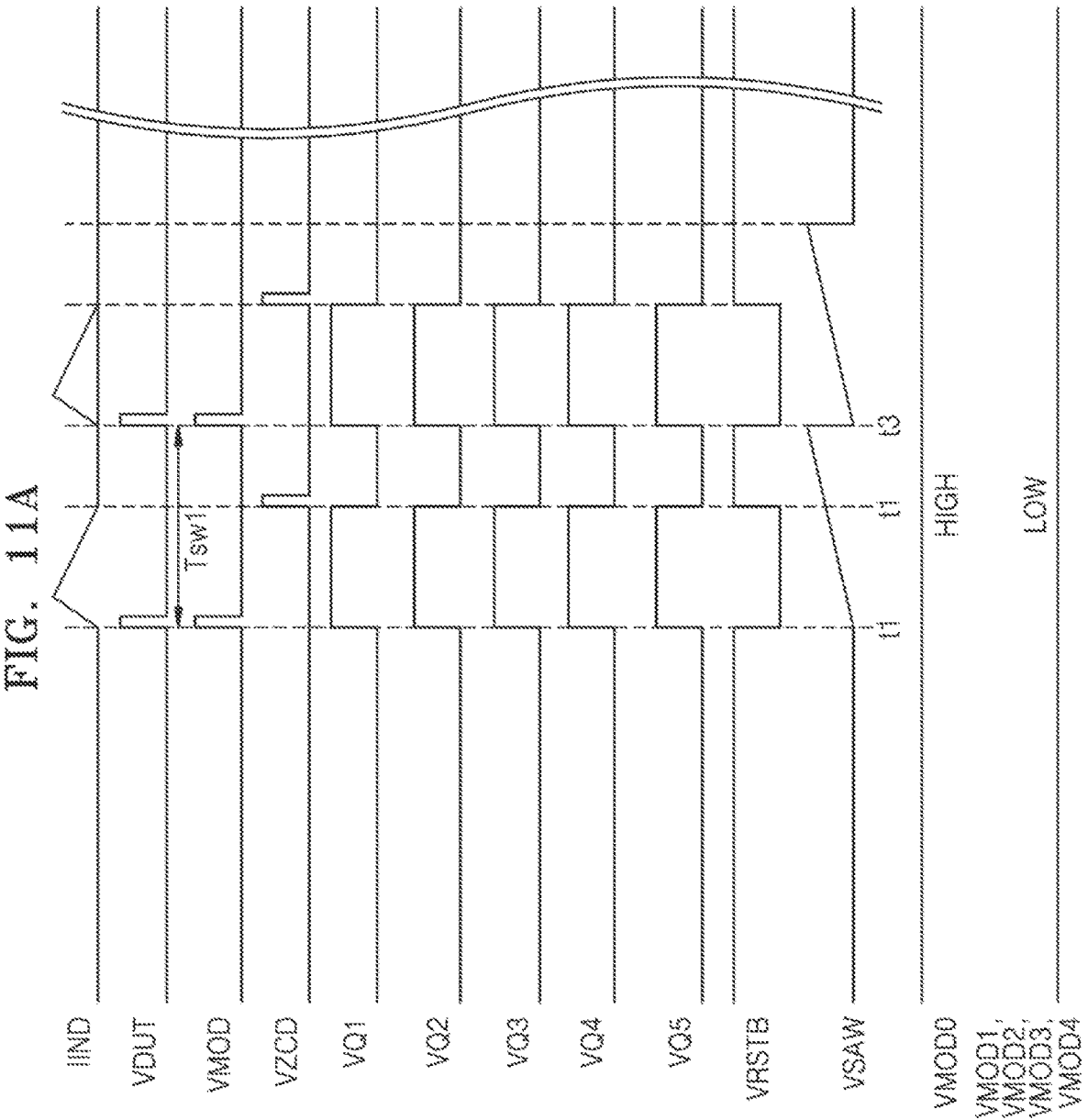
FIGS. 11A and 11B are timing diagrams of a modulation operation according to an example embodiment.
Figure 11B:
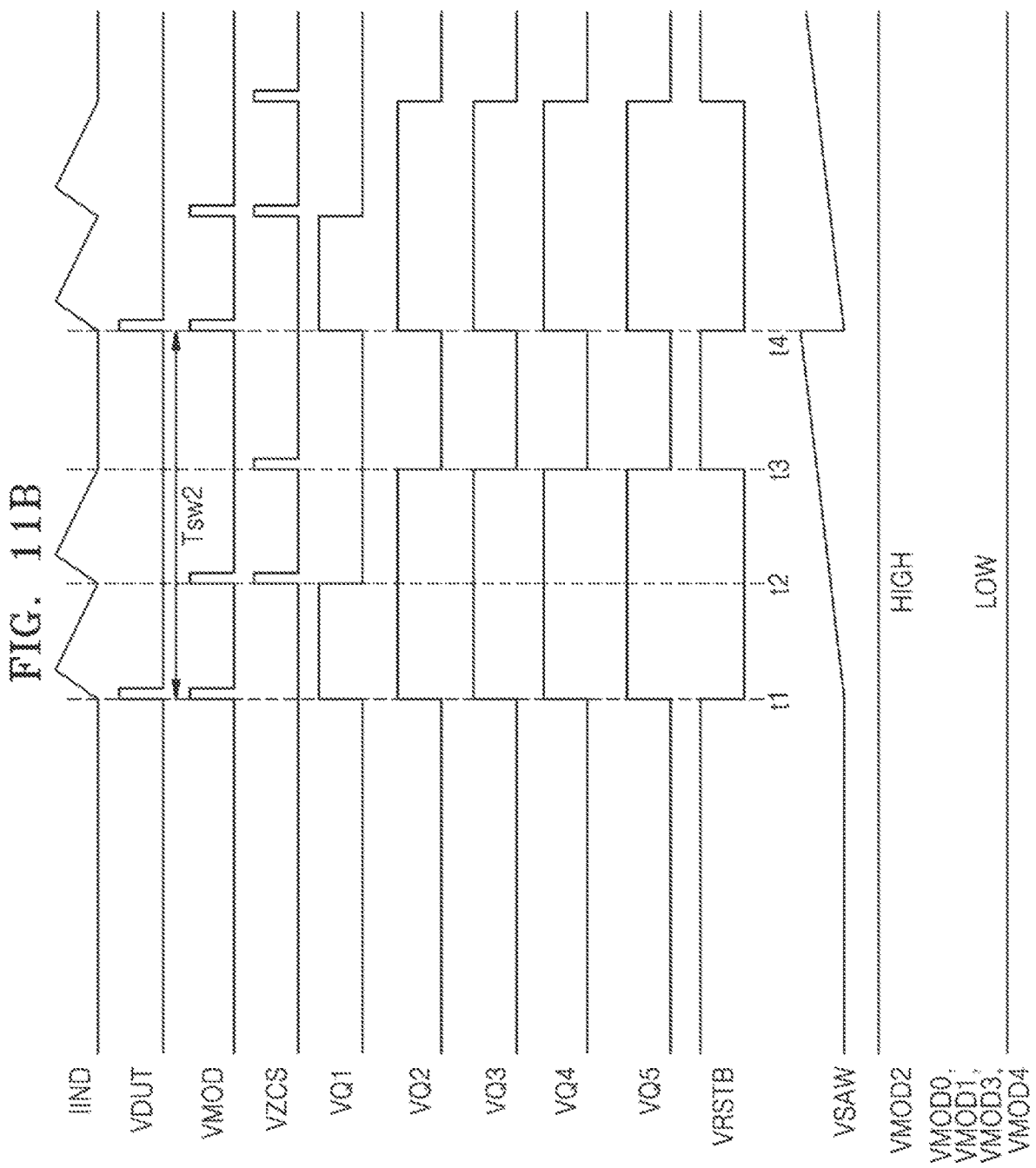

FIG. 10 is a diagram describing a switching modulator 131 according to an example embodiment. FIGS. 11A and 11B are timing diagrams of a modulation operation according to an example embodiment.

Referring to FIG. 10, a frequency detector 132 may detect a switching frequency of a voltage VDUT, based on a clock signal VCLK and the voltage VDUT. In detail, during an activation time period of the clock signal VCLK, the switching frequency of the voltage VDUT may be detected by counting an edge of the voltage VDUT.

The frequency detector 132 may activate a mode up signal VUP or a mode down signal VDN, based on the switching frequency of the voltage VDUT. When the mode up signal VUP is activated, a frequency of a voltage VMOD may decrease by ½ times, and when the mode down signal VDN is activated, the frequency of the voltage VMOD may decrease by twice. In detail, when the switching frequency of the voltage VDUT is within an audible frequency, the frequency detector 132 may activate the mode up signal VUP or the mode down signal VDN. The mode up signal VUP and the mode down signal VDN may be referred to as a frequency control signal.

A frequency controller 133 may include a modulation counter 1010, a plurality of AND circuits 1021 to 1026, a plurality of latch circuits 1031 to 1036, a NOR circuit 1040, a plurality of OR circuits 1051 and 1052, an inverter 1060, and a delay circuit 1070.

Based on the frequency control signal, the modulation counter 1010 may activate a signal VMOD0 which indicates the non-performance of a modulation operation, a signal VMOD1 which indicates a 2-times modulation operation, a signal VMOD2 which indicates a 4-times modulation operation, a signal VMOD3 which indicates an 8-times modulation operation, and a signal VMOD4 which indicates a 16-times modulation operation. For example, in a state where the 2-times modulation operation is being performed currently (i.e., a state where the signal VMOD1 is activated), when an activated mode up signal VUP is received, the modulation counter 1010 may activate the signal VMOD2 which indicates the 4-times modulation operation and deactivate the signals VMOD0, VMOD1, VMOD3 and VMOD4.

Referring to FIG. 10, the OR circuit 1052 may activate the voltage VMOD during an activation period where the voltage VDUT is maintained to be '1'. While a voltage VRSTB is maintained to be '0', a clock signal CK of the latch circuit 1036 may be a voltage VZCD, based on the inverter 1060 and the AND circuit 1026. That is, while the voltage VRSTB is maintained to be '0', an output value VQ6 may be transitioned to '1' at a timing at which the voltage VZCD is transitioned to '1'. The latch circuit 1036 may be reset after a delay time based on the delay circuit 1070, and thus, the an output value VQ6 may be maintained to be '1' for the delay time. That is, the voltage VMOD may be activated throughout both an activation period of the voltage VDUT and an activation period of the voltage VZCD.

Referring to FIG. 11A, when a modulation operation is not performed, the signal VMOD0 may be activated, and the signals VMOD1 to VMOD4 may be deactivated. The OR circuit 1051 may output the voltage VDUT up to a second time t2 from a first time t1, and thus, the voltage VMOD may be the same as the voltage VDUT.

While the voltage VDUT is being activated, the voltage VRSTB may be transitioned to '0' by the NOR circuit 1040, and thus, a reset operation of each of the latch circuits 1031 to 1035 may stop and a latching operation of each of the latch circuits 1031 to 1035 may be performed by the OR circuit 1051. Therefore, voltages VQ1 to VQ5 may be transitioned to '1'. The voltage VRSTB may be maintained to be '0' by the AND circuit 1021 and the NOR circuit 1040.

When the voltage VZCD is activated to '1' at the second time t2, an output value VQ1 of the latch circuit 1031 may be transitioned to '0', and thus, the AND circuit 1021 may output '0'. Accordingly, the voltage VRSTB, which is an output value of the NOR circuit 1040, is transitioned to '1', and thus, the voltages VQ1 to VQ5 may be reset to '0'. Because the voltage VRSTB is '1', even when the voltage VZCD is transitioned, a clock value of the latch circuit 1036 may not be changed by the inverter 1060 and the AND circuit 1026. Therefore, the voltage VMOD may be the same as the voltage VDUT.

As described above with reference to FIG. 6, a voltage VSAW may reach a reference voltage VOSC.REF at a third time t3. Accordingly, operations performed between the first time t1 and the third time t3 may be repeated. In FIG. 11A, a switching period may be Tsw1.

Referring to FIG. 11B, when the 2-times modulation operation is performed, the signal VMOD1 may be activated, and the signals VMOD0 and VMOD2 to VMOD4 may be deactivated. The OR circuit 1051 may output the voltage VDUT up to a second time t2 from a first time t1, and thus, the voltage VMOD may be the same as the voltage VDUT.

While the voltage VDUT is being activated, the voltage VRSTB may be transitioned to '0' by the NOR circuit 1040, and thus, a reset operation of each of the latch circuits 1031 to 1035 may stop and a latching operation of each of the latch circuits 1031 to 1035 may be performed by the OR circuit 1051. Therefore, voltages VQ1 to VQ5 may be transitioned to '1'. The voltage VRSTB may be maintained to be '0' by the AND circuit 1022 and the NOR circuit 1040.

When the voltage VZCD is activated to '1' at the second time t2, the output value VQ1 of the latch circuit 1031 may be transitioned to '0' but the latch circuits 1032 to 1035 may perform a latching operation at a rising edge of a clock, and thus, the output values VQ2 to VQ5 may be maintained to be '1'. Accordingly, the voltage VRSTB, which is an output value of the NOR circuit 1040, may maintain '0'. Because the voltage VRSTB maintains '0', when the voltage VZCD is activated at the second time t2, a clock signal applied to the latch circuit 1036 may be activated by the inverter 1060 and the AND circuit 1026. Therefore, the voltage VMOD may be activated for a delay time from the second time t2. Furthermore, when the voltage VMOD is activated, first and second control signals VGD_HS and VGD_LS may be controlled, and thus, a variation of the current IIND between the second time t2 and the third time t3 may be the same as a variation of the current IIND between the first time t1 and the second time t2.

When the voltage VZCD is activated to '1' at the third time t3, the output value VQ1 of the latch circuit 1031 may be instantaneously transitioned to '1', and thus, the output value VQ2 may be shifted to '0' and the AND circuit 1022 may output '0'. Accordingly, the voltage VRSTB, which is an output value of the NOR circuit 1040, is transitioned to '1', and thus, the voltages VQ1 to VQ5 may be reset to '0'. Because the voltage VRSTB is '1', even when the voltage VZCD is transitioned, a clock value of the latch circuit 1036 may not be changed by the inverter 1060 and the AND circuit 1026.

As described above with reference to FIG. 6, the voltage VSAW may reach the reference voltage VOSC.REF at a fourth time t4. Accordingly, operations performed between the first time t1 and the fourth time t4 may be repeated. In FIG. 11B, a switching period may be Tsw2.

In FIG. 11A, the current IIND has occurred no more than once in each period, and in FIG. 11B, the current IIND has occurred twice in one period and an electric charge accumulated into and discharged from the inductor 114 may be twice compared to a timing diagram of FIG. 11A. That is, in performing an N-times modulation operation, an electric charge Q' which is accumulated into and discharged from the inductor 114 by the current IIND flowing in the inductor 114 may be calculated based on the following Equation 6. Equation 6 may be understood with reference to FIG. 9 and Equation 3.

$$Q' = N * Q = N * \frac{1}{2} \frac{VCHG}{LIND} \left( \frac{VCHG - VSYS}{VSYS} \right) D^2 \qquad \text{[Equation 6]}$$

In the N-times modulation operation, an average current IAVG' may be calculated based on the following Equation 7.

$$IAVG' =$$
$$\frac{Q'}{TswN} = Q' \cdot fswN = N \frac{1}{2} \frac{VCHG}{LIND} \left( \frac{VCHG - VSYS}{VSYS} \right) D^2 \cdot fswN \qquad \text{[Equation 7]}$$

The average current IAVG' may be understood as a current Iout' flowing in the load, and thus, a switching frequency fswN in performing the N-times modulation operation may be calculated based on the following Equation 8.

$$fswN = \frac{2LIND \cdot VSYS}{N \cdot VCHG \cdot (VCHG - VSYS) \cdot D^2} = \frac{1}{N} fsw \qquad \text{[Equation 8]}$$

That is, the switching frequency fswN in performing the N-times modulation operation may be 1/N times a switching frequency fsw of when a modulation operation is not performed. Accordingly, the switching period Tsw1 of FIG. 11A may be ½ times the switching period Tsw2 of FIG. 11B.

The 4-times, 8-times, and 16-times modulation operations are not specifically described, but the descriptions of FIGS. 11A and 11B may be applied thereto and frequencies of the voltage VMOD in performing the 4-times, 8-times, and 16-times modulation operations may be ¼ times, ⅛ times, and 1/16 times a frequency of the voltage VDUT.

Figure 12:
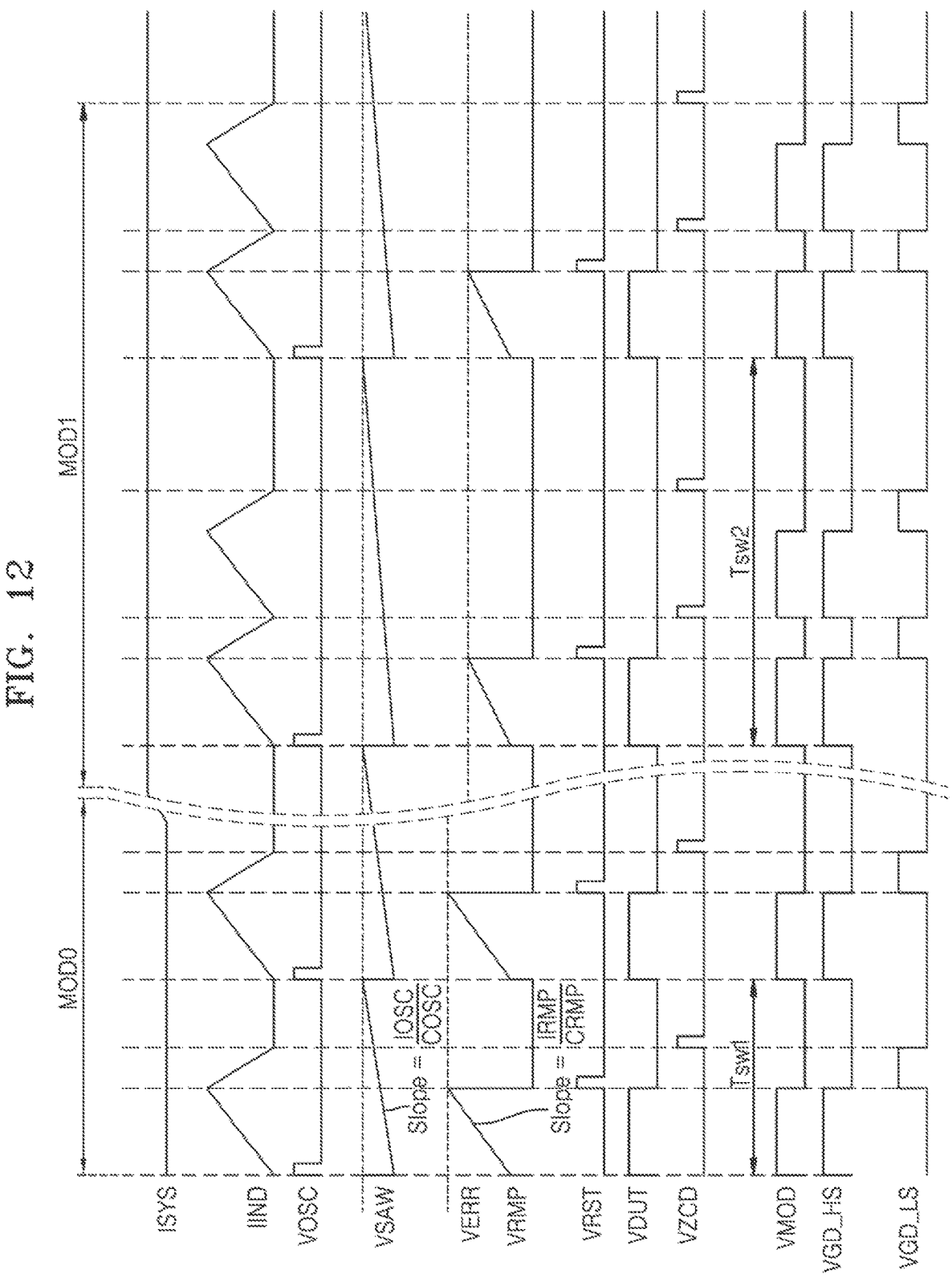
FIG. 12 is a timing diagram of a frequency modulation operation according to an example embodiment.

FIG. 12 is a timing diagram of a frequency modulation operation according to an example embodiment.

Referring to FIG. 12, when a modulation operation is not performed in operation MOD0, a switching period of a voltage VMOD may be Tsw1, and in performing a 2-times modulation operation MOD1, a switching period of the voltage VMOD may be Tsw2.

As described above with reference to FIGS. 11A and 11B, the switching period Tsw1 in performing a modulation operation may be ½ times the switching period Tsw2 in performing the 2-times modulation operation.

Referring to FIG. 12, first and second control signals VGD_HS and VGD_LS may be controlled based on the voltage VMOD and a voltage VZCD. A current IIND may be induced by the first and second control signals VGD_HS and VGD_LS. The amount of electric charge accumulated into and discharged from the inductor 114 by the induced current IIND may be changed, and as the amount of electric charge is changed, a switching period (i.e., a switching frequency) may be changed.

Figure 13:
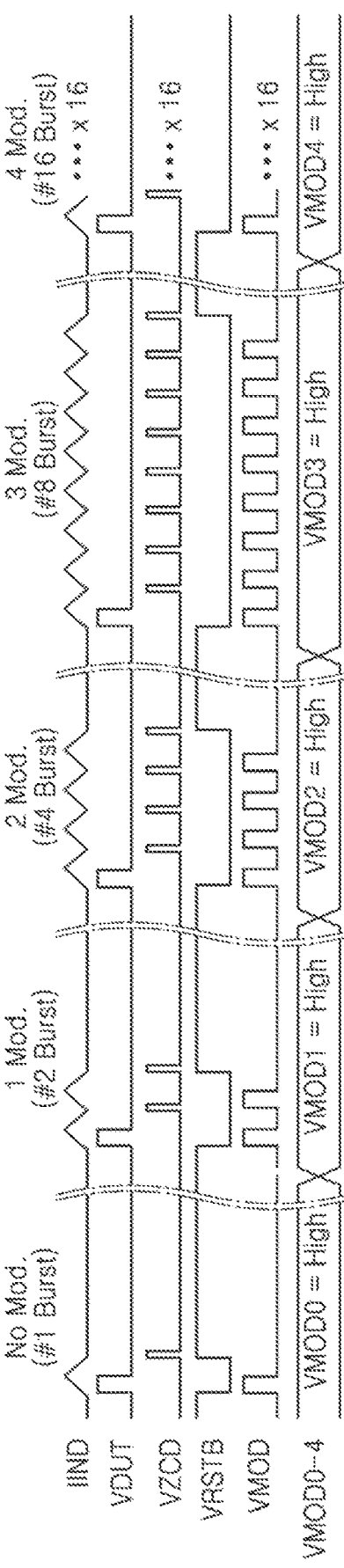
FIG. 13 is a timing diagram of a modulation operation, according to an example embodiment.

FIG. 13 is a timing diagram of a modulation operation, according to an example embodiment.

Referring to FIG. 13, when a modulation operation is not performed (No Mod), a voltage VMOD0 may be '1' (i.e., a high state), and the other voltages VMOD1 to VMOD4 may be '0' (i.e., a low state). A current IIND may be induced once (i.e., a boost number is 1), and a voltage VDUT and a voltage VMOD may have the same waveform.

In performing a 2-times modulation operation (1 MOD), the voltage VMOD1 may be in a high state, and the other voltages VMOD0 and VMOD2 to VMOD4 may be in a low state. The current IIND may be induced twice (i.e., a boost number is 2), and the voltage VMOD may be toggled twice. A frequency of the voltage VMOD in performing the 2-times modulation operation may be ½ times a frequency of the voltage VMOD in performing a modulation operation.

In FIG. 13, up to a 16-times modulation operation is illustrated, but example embodiments are not limited thereto and various-times modulation operations such as a 32-times modulation operation and a 64-times modulation operation may be performed.

Figure 14:
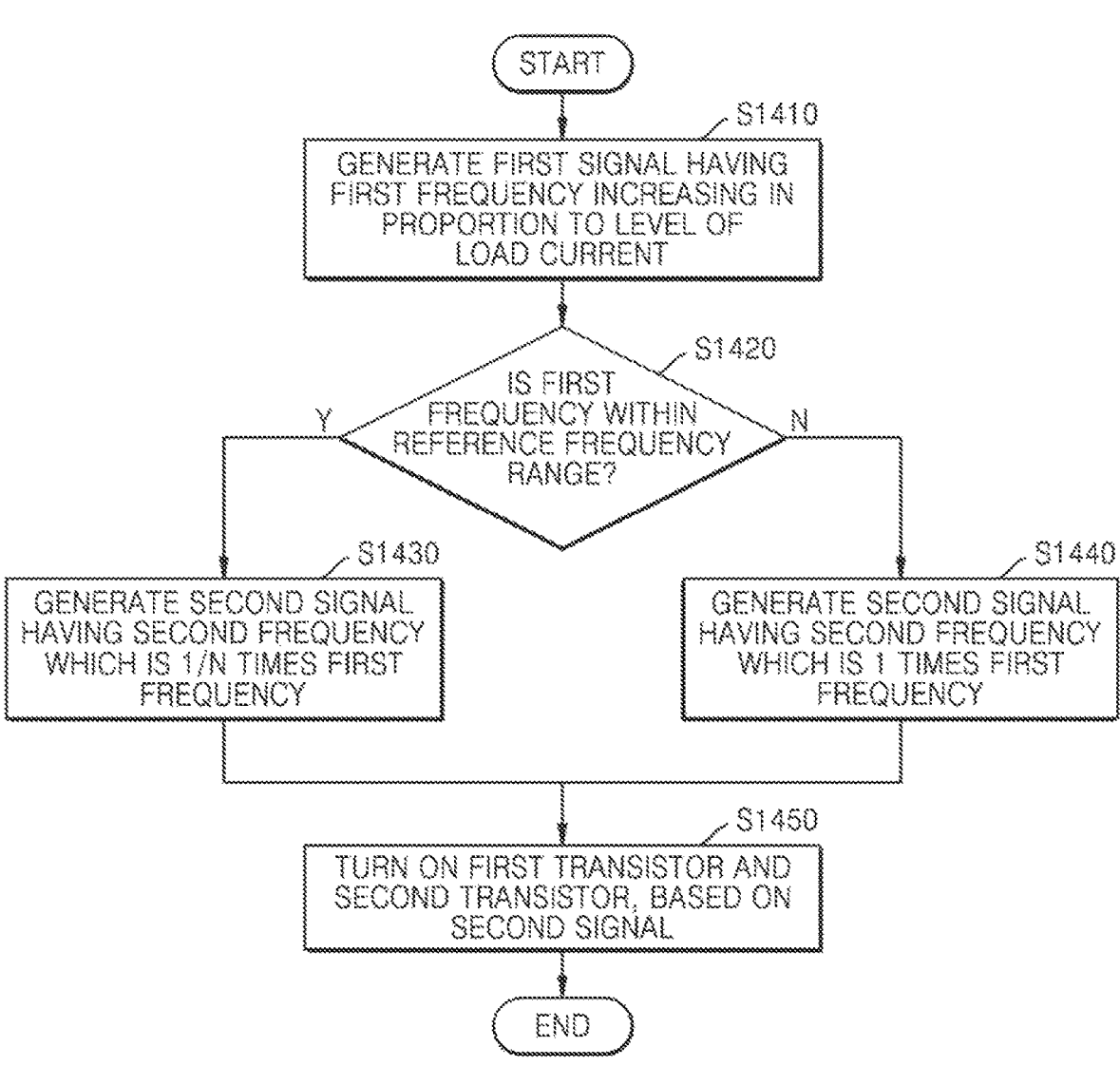
FIG. 14 is a diagram for describing a control method of a bidirectional switching converter, according to an example embodiment.

FIG. 14 is a diagram describing a control method of a bidirectional switching converter, according to an example embodiment.

In operation S1410, the switching signal generator 123 may generate the voltage VDUT having a first frequency which increases in proportion to a level of a load current. A description of a method of generating the voltage VDUT by using the switching signal generator 123 has been given above with reference to FIGS. 1 to 12, and thus, is not repeated.

When the first frequency is within a reference frequency range (Y) in operation S1420, the switching modulator 131 may generate the voltage VMOD having a second frequency which is 1/N (where N is a natural number of 2 or more) of the first frequency in operation S1430. That is, the switching modulator 131 may generate the voltage VMOD having the second frequency which is lower than the first frequency. Herein, the reference frequency range may denote an audible frequency range. A description of a method of generating the voltage VMOD by using the switching modulator 131 has been given above with reference to FIGS. 5, 8, 10, 11A, and 11B, and thus, is not repeated.

When the first frequency is outside the reference frequency range (N) in operation S1420, the switching modulator 131 may generate the voltage VMOD having the second frequency having the same value as that of the first frequency in operation S1440.

The duty controller 121 may generate the first control signal VGD_HS and the second control signal VGD_LS, based on the voltage VMOS, and thus, may turn on or off the first transistor 111 and the second transistor 112 in operation S1450.

While example embodiments have been shown and described, it will be understood that various changes in form and details may be made therein without departing from the spirit and scope of the following claims.

What is claimed is:

1. An electronic device comprising:
   a first transistor configured to connect an input voltage node to a switching node;
   a second transistor configured to connect the switching node to a ground node;
   a latch circuit configured to generate a first signal having a first frequency and to control the first frequency based on a level of a load current;
   a switching modulation circuit configured to control an N-times modulation operation on the first signal to generate a second signal having a second frequency which is 1/N times the first frequency, wherein N is a natural number of 2 or more when the first frequency is within a reference frequency range, and N is 1 when the first frequency is outside the reference frequency range; and
   a controller configured to control each of the first transistor and the second transistor, based on the second signal.

2. The electronic device of claim 1, wherein the first frequency is within the reference frequency range, and wherein the second frequency is outside the reference frequency range.

3. The electronic device of claim 1, wherein the switching modulation circuit is further configured to control the second frequency to be $1/(2^{K+1})$ based on the first frequency reaching $2^K$ times a lower level of the reference frequency range and being less than an upper level of the reference frequency range, wherein K is a natural number or zero.

4. The electronic device of claim 3, wherein the switching modulation circuit is further configured to control the second frequency to 1 times the first frequency based on the first frequency being greater than the upper level of the reference frequency range.

5. The electronic device of claim 1, further comprising:
   an inductor connected with the switching node and configured to conduct an inductor current, wherein the inductor current increases based on the first transistor being on and decreases based on the second transistor being on; and
   a zero current detection circuit configured to detect a zero level of the inductor current N times during a period of the second signal.

6. The electronic device of claim 1, wherein the first transistor is configured to turn on and off based on a first control signal,
   wherein the controller is further configured to control the first control signal to turn on the first transistor N times during a period of the second signal, and
   wherein an interval between the N times is less than a period of the first signal.

7. The electronic device of claim 1, wherein the second transistor is configured to turn on and off based on a second control signal,
   wherein the controller is further configured to control the second control signal to turn off the second transistor N times during a period of the second signal, and
   wherein an interval between the N times is less than a period of the first signal.

8. An electronic device comprising:
   a first transistor configured to connect an input node with a switching node according to a first control signal;
   a second transistor configured to connect the switching node with a ground node according to a second control signal;
   an inductor connected with the switching node and configured to conduct an inductor current, wherein the inductor current increases based on the first transistor being on and decreases based on the second transistor being on;
   an oscillator configured to generate a first signal, based on an error signal, wherein the error signal is generated based on a level of an input signal applied to the input node;
   a ramp generation circuit configured to generate a ramp signal, based on the first control signal and the second control signal;
   a comparator circuit configured to generate a second signal, based on the error signal and the ramp signal;
   a latch circuit configured to generate a third signal having a first frequency, based on the first signal and the second signal;
   a switching modulation circuit configured to generate a fourth signal having a second frequency which is less than the first frequency; and
   a controller configured to generate the first control signal and the second control signal, based on the fourth signal.

9. The electronic device of claim 8, wherein the controller is further configured to activate the first control signal based on activation of the first signal and deactivate the first control signal based on activation of the second signal.

10. The electronic device of claim 8, wherein the controller is further configured to activate the second control signal based on activation of the second signal and deactivate the second control signal based on the inductor current being 0.

11. The electronic device of claim 8, wherein the first frequency is within a reference frequency range, and the second frequency is outside the reference frequency range.

12. The electronic device of claim 8, wherein the switching modulation circuit is further configured to control the second frequency to be less than a lower level of a reference frequency range based on the first frequency being within the reference frequency range.

13. The electronic device of claim 12, wherein the switching modulation circuit is further configured to control the second frequency to be equal to the first frequency based on the first frequency being outside the reference frequency range.

14. The electronic device of claim 8, further comprising a zero current detection circuit configured to detect a zero level of the inductor current at least twice during a period of the second signal.

15. The electronic device of claim 8, wherein the controller is further configured to control the first control signal and the second control signal to turn on each of the first transistor and the second transistor at least two times during a period of the second signal, and wherein an interval between times at which the first control signal turns on the first transistor is less than a period of the first signal.

* * * * *